US007709564B2

(12) United States Patent
Uchida

(10) Patent No.: US 7,709,564 B2
(45) Date of Patent: May 4, 2010

(54) RUBBER COMPOSITION FOR COATING STEEL CORD AND TIRE HAVING BELT USING SAME

(75) Inventor: Mamoru Uchida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/987,096

(22) Filed: Nov. 27, 2007

(65) Prior Publication Data

US 2008/0153961 A1    Jun. 26, 2008

(30) Foreign Application Priority Data

Dec. 22, 2006    (JP) ............... 2006-345827

(51) Int. Cl.
*B60C 1/00* (2006.01)
*C08K 5/00* (2006.01)
*C08K 3/38* (2006.01)
*C08K 5/04* (2006.01)
*C08K 3/00* (2006.01)

(52) U.S. Cl. ............... 524/261; 524/424; 524/492; 524/405; 524/398; 524/399

(58) Field of Classification Search .......... 524/492, 524/424, 405, 261, 398, 399
See application file for complete search history.

(56) References Cited

U.S. PATENT DOCUMENTS

| 6,353,047 B1* | 3/2002 | Hilton et al. ............... 524/398 |
| 2005/0187332 A1* | 8/2005 | Minagawa et al. .......... 524/492 |
| 2006/0102269 A1 | 5/2006 | Uchida et al. |
| 2009/0114321 A1* | 5/2009 | Nakamura ............... 152/152.1 |

FOREIGN PATENT DOCUMENTS

| CN | 1657558 A | 8/2005 |
| CN | 1775835 A | 5/2006 |
| EP | 0 208 505 A1 | 1/1987 |
| EP | 1 566 404 A1 | 8/2005 |

(Continued)

OTHER PUBLICATIONS

Chinese Office Action issued on Jan. 15, 2010 in corresponding Chinese Application No. 2007101943544.

*Primary Examiner*—William K Cheung
(74) *Attorney, Agent, or Firm*—Birch, Stewart, Kolasch and Birch, LLP

(57) ABSTRACT

The present invention provides a rubber composition for coating a steel cord, use of which makes it possible to consider an effect on environment, prepare for the future decrease in supply of petroleum resources, suppress generation of air bubbles, reduce rolling resistance, and improve processability, roll workability, adhesion to a steel cord and durability with favorable balance, as compared with a rubber composition for coating a steel cord comprising raw materials derived from petroleum resources as main components, and provides a tire having a belt prepared by using the rubber composition. The rubber composition for coating a steel cord comprises 40 to 80 parts by weight of silica having a nitrogen adsorbing-specific surface area of 100 to 200 $m^2/g$, 1 to 15 parts by weight of a silane coupling agent and 0.5 to 3 parts by weight of potassium borate, on the basis of 100 parts by weight of a diene rubber component, and the tire is prepared using the rubber composition.

4 Claims, 1 Drawing Sheet

FOREIGN PATENT DOCUMENTS

| | | |
|---|---|---|
| EP | 1 659 000 A1 | 5/2006 |
| JP | 8-230411 A | 9/1996 |
| JP | 11-269313 A | 10/1999 |
| JP | 2003-64222 A | 3/2003 |
| JP | 2005-232295 A | 9/2005 |

* cited by examiner

RUBBER COMPOSITION FOR COATING STEEL CORD AND TIRE HAVING BELT USING SAME

BACKGROUND OF THE INVENTION

The present invention relates to a rubber composition for coating a steel cord and a tire having a belt using the rubber composition.

Generally, since a heavy load is applied to tires for an automobile, a steel cord is used as a reinforcing material. Particularly during running, if a rubber and a steel cord are peeled off due to heat generation of tires, crucial breakdown is caused on the tires.

Conventionally, carbon black is mainly used as a reinforcing filler for a rubber composition for coating a steel cord. However, in recent years, there are increasing interests in environmental preservation on the earth and automobiles are not exceptional, thus, regulations for suppressing $CO_2$ emission are reinforced. Further, since petroleum resources are limited and supply thereof has been decreasing year by year, oil prices are expected to increase in the future, and consequently, there is limitation on uses of materials derived from petroleum resources such as carbon black. In view of such a background, JP-A-2003-64222 discloses a means, wherein silica is used in tire parts. However, when silica is used, there is a problem that a Mooney viscosity of a rubber composition is increased, and processability of the rubber composition is deteriorated. In order to solve these problems, a means for lowering rolling resistance and improving processability is known, wherein specific silica is compounded to a rubber composition for coating a steel cord. When such specific silica which dose not lower processability is used, there is a problem that sufficient reinforcing property cannot be obtained.

Accordingly, in order to enhance reinforcing property, a method of reinforcing a rubber by a reaction of a silanol group of a silica surface with an ethoxy group of a coupling agent by using silica and a coupling agent is known. In this case, in order to accelerate this reaction during kneading, it is necessary to increase a kneading temperature to 140° C. or more. However, only by this, the reaction of a silanol group of a silica surface with an ethoxy group of a coupling agent does not proceed during kneading of a base rubber, and this reaction proceeds during a topping step where a steel cord is coated with a rubber composition, resulting in accumulation of generated ethanol in the coated rubber composition and thus a so-called blister phenomenon is generated. If this phenomenon occurs, there arise problems that necessity of decreasing a line speed during the topping step occurs, and a rubber thickness of a blistering portion becomes non-uniform, thus deteriorating adhesion between the steel cord of that portion and the rubber. In addition, an unreacted silane coupling agent reacts with a metal oxide layer of a roll, thereby causing a phenomenon that the rubber is not peeled off from the roll, which results in a problem that productivity is lowered.

SUMMARY OF THE INVENTION

It is an object of the present invention to provide a rubber composition for coating a steel cord, use of which makes it possible to consider an effect on environment, prepare for the future decrease in supply of petroleum resources and suppress generation of bubbles, reduce rolling resistance, and improve processability, roll workability, adhesion to a steel cord and durability with favorable balance, as compared with a rubber composition for coating a steel cord comprising raw materials derived from petroleum resources as main component, and to provide a tire having a belt prepared by using the rubber composition.

The present invention relates to a rubber composition for coating a steel cord comprising 40 to 80 parts by weight of silica having a nitrogen adsorbing-specific surface area of 100 to 200 m²/g, 1 to 15 parts by weight of a silane coupling agent and 0.5 to 3 parts by weight of potassium borate, on the basis of 100 parts by weight of a diene rubber component.

It is preferable that the rubber composition for coating a steel cord further comprises 10 to 20 parts by weight of zinc oxide, 3.5 to 6 parts by weight of sulfur and 0.5 to 2 parts by weight of organic cobalt, on the basis of 100 parts by weight of a diene rubber component.

It is preferable that the silane coupling agent is represented by the following general formula:

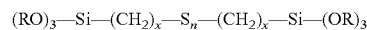

$$(RO)_3-Si-(CH_2)_x-S_n-(CH_2)_x-Si-(OR)_3$$

wherein R is a linear or branched alkyl group having 1 to 8 carbon atoms, x is an integer of 1 to 8, n represents the number of sulfur atoms in a polysulfide part, and an average value of n is 2 to 3, and an amount of the silane coupling agent having two sulfur atoms in the polysulfide part is not less than 60% by weight in the whole silane coupling agent.

In the rubber composition for coating a steel cord, a kneading temperature of a base rubber is preferably 140° C. to 160° C.

The present invention further relates to a tire having a belt prepared by using the rubber composition for coating a steel cord.

DETAILED DESCRIPTION

Figure 1:
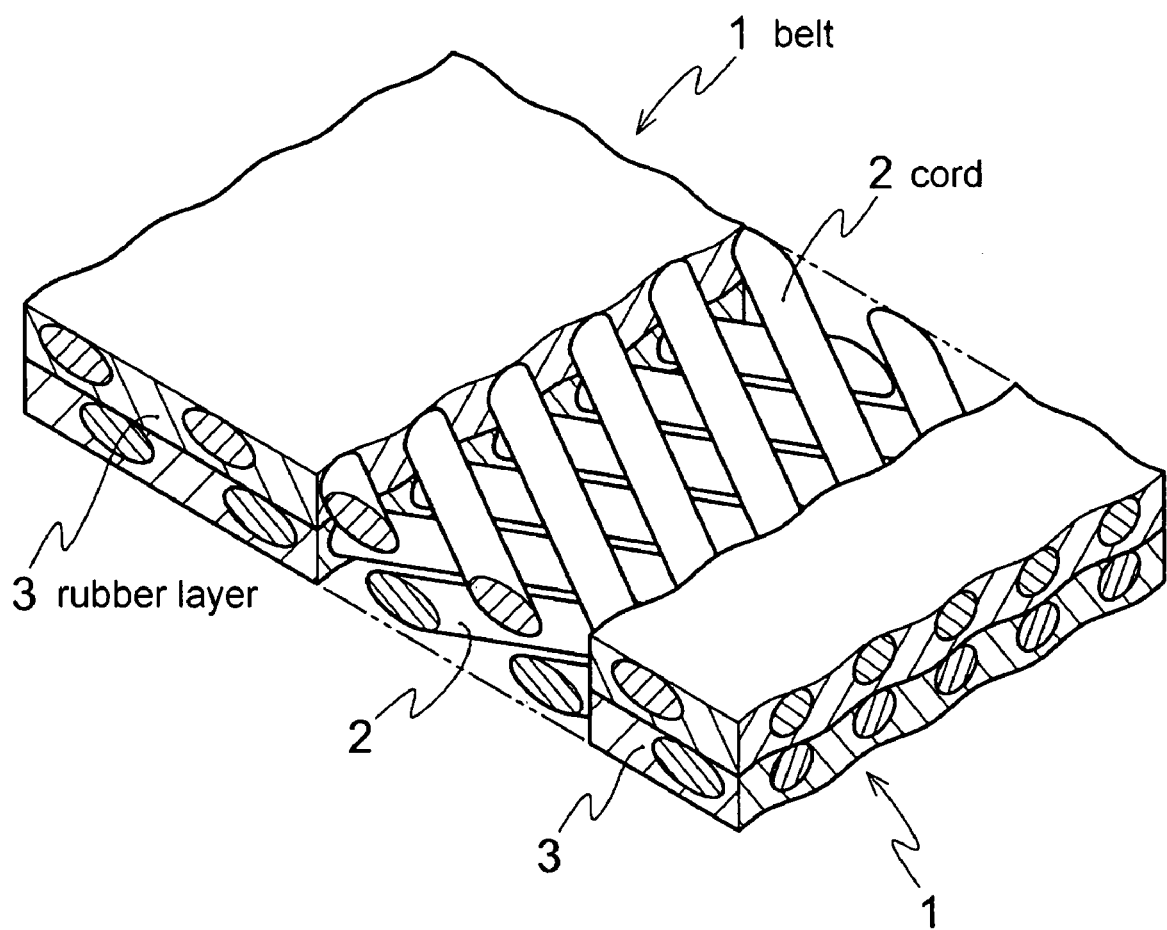
FIG. 1 is a partial perspective view showing a structure of the belt for a tire prepared using the rubber composition for coating a steel cord of the present invention.

The rubber composition for coating a steel cord of the present invention comprises a diene rubber component, silica, a silane coupling agent and potassium borate.

FIG. 1 is a partial perspective view showing a structure of the belt for a tire prepared using the rubber composition for coating a steel cord of the present invention.

In the embodiment, the belt is used for a radial tire and fills the role of enhancing rigidity of a tread by tightening a carcass of radial structure strongly and functions to improve steering stability and abrasion resistance. The belt has a large tension generated by a pneumatic pressure of a tire, and functions to inhibit a large distortion from being generated during rolling between the belt and another neighboring belt crossing at an angle.

As shown in FIG. 1, a belt 1 is composed of a cord 2 and a rubber layer 3 coated on the cord 2. For example, a cord giving small elongation and having high rigidity such as a steel cord is suitably used as the cord 2. In FIG. 1, two layers of belt 1 are so overlapped that the cords 2 are crossing with each other.

Generally two layers of belt 1 are considered to be an integrated composite article comprising the cords 2 and the rubber layers 3, and a shearing strain is generated between the two belt layers. The rubber layers 3 function to absorb this shearing strain by deformation of the rubber layers.

The above-mentioned belt 1 is only an example of the present invention, and various alterations can be applied according to Claims disclosed herein.

The diene rubber component is not particularly limited, and examples of the rubber components are a natural rubber (NR), an epoxidized natural rubber (ENR), a styrene-butadiene rubber (SBR), a butadiene rubber (BR) and an isoprene rubber (IR). Among these, from the viewpoint of considering an effect on environment and preparing for the future decrease in supply of petroleum resources, NR or ENR is preferable, and NR is more preferable.

NR is not particularly limited, and NR conventionally used in the tire industries such as TSR20 and RSS#3 can be used.

Silica is not particularly limited, and silica prepared by a wet method or a dry method can be used.

A nitrogen adsorbing-specific surface area (hereinafter referred to as BET) of silica is not less than 100 m²/g, preferably not less than 110 m²/g. When BET of silica is less than 100 m²/g, an effect of improving reinforcing property by compounding silica is not sufficient and belt edge durability is lowered. Further, BET of silica is not more than 200 m²/g, preferably not more than 180 m²/g. When BET of silica is more than 200 m²/g, processability is deteriorated. BET of silica can be measured in accordance with ASTM-D-4820-93.

An amount of silica is not less than 40 parts by weight, preferably not less than 50 parts by weight based on 100 parts by weight of the diene rubber component. When the amount of silica is less than 40 parts by weight, a reinforcing effect of the rubber is poor and belt edge durability is deteriorated. Further, the amount of silica is not more than 80 parts by weight, preferably not more than 70 parts by weight. When the amount of silica is more than 80 parts by weight, Mooney viscosity is raised and processability is deteriorated.

In the present invention, it is preferable that the silane coupling agent is one represented by the following formula:

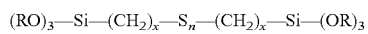

$(RO)_3-Si-(CH_2)_x-S_n-(CH_2)_x-Si-(OR)_3$ wherein R is a linear or branched alkyl group having 1 to 8 carbon atoms, x is an integer of 1 to 8, n represents the number of sulfur atoms in a polysulfide part, and an average value of n is 2 to 3, and an amount of the silane coupling agent having two sulfur atoms in the polysulfide part is not less than 60% by weight in the whole silane coupling agent.

In the formula, R is preferably a linear or branched alkyl group, more preferably a linear alkyl group.

The number of carbon atoms in R is preferably 1 to 8, more preferably 2 to 7. When the number of carbon atoms in R is 0, an alkoxy group does not exist, and bonding property between the silica and the silane coupling agent tends to be impaired, and when it is more than 8, affinity between the silica and the silane coupling agent tends to be impaired.

x is preferably 1 to 8, more preferably 2 to 7. When x is 0, such a silane coupling agent is chemically unstable, and decomposition and deterioration of the silane coupling agent in the rubber composition tends to be promoted. When x is more than 8, an amount of the silane coupling agent necessary to obtain a sufficient reinforcing effect tends to excessively increase.

n represents the number of sulfur atoms in the polysulfide part. Herein, an average value of n is preferably 2 to 3. When the average value of n is less than 2, a decomposing temperature of the silane coupling agent is high, thus, it becomes possible to knead at a higher temperature, but a vulcanization speed tends to be fast. When the average value of n is more than 3, a decomposing temperature of the silane coupling agent is lowered, thus, decomposition easily occurs during kneading and sulfur atoms are released, and consequently a problem of generating rubber scorch during kneading tends to be easily caused.

Examples of a silane coupling agent satisfying the mentioned requirements are bis(3-triethoxysilylpropyl)disulfide, bis(3-triethoxysilylpropyl)trisulfide, bis(2-triethoxysilylethyl)disulfide, bis(2-triethoxysilylethyl)trisulfide, bis(3-trimethoxysilylpropyl)disulfide, bis(3-trimethoxysilylpropyl)trisulfide, bis(2-trimethoxysilylethyl)disulfide, bis(2-trimethoxysilylethyl)trisulfide, bis(4-triethoxysilylbutyl)disulfide, bis(4-triethoxysilylbutyl)trisulfide, bis(4-trimethoxysilylbutyl)disulfide, and bis(4-trimethoxysilylbutyl)trisulfide, and these silane coupling agents can be used alone, or at least 2 kinds thereof may be used in combination.

Further, an amount of the silane coupling agent having two sulfur atoms in the polysulfide part is preferably not less than 60% by weight in the whole silane coupling agent. When the amount of the silane coupling agent having two sulfur atoms in the polysulfide part is less than 60% by weight, if a kneading temperature of the base rubber is set at 140° C. to 160° C., sulfur atoms of the silane coupling agent tend to be easily released, vulcanization tends to be promoted during kneading, and consequently processability tends to be deteriorated. Particularly, an amount of the silane coupling agent having two sulfur atoms is most preferably 100% by weight in the whole silane coupling agent.

An amount of the silane coupling agent is not less than 1 part by weight, preferably not less than 2 parts by weight based on 100 parts by weight of the diene rubber component. When the amount of the silane coupling agent is less than 1 part by weight, a sufficient reinforcing effect of the rubber composition cannot be obtained, Mooney viscosity is raised and processability is deteriorated. Further the amount of the silane coupling agent is not more than 15 parts by weight, preferably not more than 12 parts by weight. When the amount of the silane coupling agent is more than 15 parts by weight, physical properties of the rubber composition and processability are not improved, and a cost of the rubber composition is increased since the silane coupling agent is an expensive material.

Potassium borate used in the present invention is not particularly limited, and examples thereof are potassium tetraborate ($K_2B_4O_7$), potassium metaborate ($KBO_2$), potassium pentaborate ($KB_5O_8$), potassium hexaborate ($K_2B_6O_{10}$), and potassium octaborate ($K_2B_8O_{13}$), and potassium tetraborate is preferable.

An amount of potassium borate is not less than 0.5 part by weight on the basis of 100 parts by weight of the diene rubber component. When the amount of potassium borate is less than 0.5 part by weight, suppression of blistering during a topping process is not enough, productivity is deteriorated, and adhesion to a steel cord is deteriorated. Further, the amount of potassium borate is not more than 3 parts by weight, preferably not more than 2 parts by weight. When the amount of potassium borate is more than 3 parts by weight, an effect of suppression of blistering becomes saturated, and adhesion to a steel cord and belt edge durability are lowered.

When potassium borate is compounded in an amount of 0.5 to 2 parts by weight based on 100 parts by weight of the diene rubber component, by accelerating the reaction of the ethoxy group of the silane coupling agent with the silanol group of the silica surface at the kneading stage, a reaction efficiency of the silane coupling agent can be enhanced, and therefore ethanol which is generated by a reaction of the unreacted ethoxy group with the silanol group and causes blistering is not generated, thereby inhibiting generation of blistering.

It is preferable that the rubber composition for coating a steel cord of the present invention further comprises zinc oxide, sulfur and organic cobalt to improve adhesion to a steel cord.

Zinc oxide is not particularly limited, and zinc oxide conventionally used in the rubber industries may be used.

An amount of zinc oxide is preferably not less than 10 parts by weight, more preferably not less than 13 parts by weight based on 100 parts by weight of the diene rubber component. When the amount of zinc oxide is less than 10 parts by weight, adhesion of the rubber to a steel cord tends to be lowered, and belt edge durability tends to be deteriorated. Further, the amount of zinc oxide is preferably not more than 20 parts by weight, more preferably not more than 18 parts by weight. When the amount of zinc oxide is more than 20 parts by weight, dispersibility of zinc oxide tends to be lowered, and belt edge durability tends to be deteriorated like the case of the amount of zinc oxide being less than 10 parts by weight.

Sulfur usable in the present invention is preferably insoluble sulfur from the viewpoint that blooming of sulfur on the rubber surface is inhibited, adhesion of the rubber composition is improved, and adhesion failure at a belt edge part during preparation of a tire can be suppressed, and specific examples of insoluble sulfur are CRYSTEX HSOT20 available from Flexsys Co., and Sanfel EX available from SAN-SHIN CHEMICAL INDUSTRY CO., LTD.

An amount of sulfur is preferably not less than 3.5 parts by weight, more preferably not less than 4 parts by weight based on 100 parts by weight of the diene rubber component. When the amount of sulfur is less than 3.5 parts by weight, adhesion strength tends to be lowered, and durability tends to be inferior. Further, the amount of sulfur is preferably not more than 6 parts by weight, more preferably not more than 5.5 parts by weight. When the amount of sulfur is more than 6 parts by weight, thermal degradation resistance of the rubber is deteriorated, and further, since blooming that is a phenomenon of precipitation of insoluble sulfur on the rubber surface which is not dissolved in the rubber is easily generated due to compounding of a large amount of sulfur, strict temperature control is required during kneading of the rubber compounded with silica in which Mooney viscosity is easily increased, and productivity tends to be lowered. When insoluble sulfur is compounded as sulfur, an amount of sulfur indicates an amount of sulfur excluding an oil content in the insoluble sulfur.

It is preferable that the rubber composition for coating a steel cord further comprises organic cobalt, and the number of carbon atoms in the organic cobalt is preferably not less than 4, more preferably not less than 11 for the reason that a cobalt salt can control the reaction of a brass-plated layer of a steel cord with sulfur in the rubber. Further, the number of carbon atoms in the organic cobalt is preferably not more than 18.

Examples of the organic cobalt usable in the present invention are cobalt naphthenate, cobalt stearate, cobalt oleate and cobalt maleate, and these organic cobalts may be used alone, or at least two kinds thereof may be used in combination. From the viewpoint of suppressing deterioration of the rubber molecule caused by oxidation, cobalt stearate is preferable.

An amount of organic cobalt is preferably not less than 0.5 part by weight on the basis of 100 parts by weight of the diene rubber component. When the amount of organic cobalt is less than 0.5 part by weight, adhesion of a steel cord to the rubber tends to be deteriorated. Further, the amount of organic cobalt is preferably not more than 2 parts by weight. When the amount of organic cobalt is more than 2 parts by weight, molecules of the rubber are subject to deterioration by oxidation due to oxidizing action of the organic cobalt and there is a tendency that reinforcing property of the vulcanized rubber is lowered and reactivity of a brass-plated layer of the steel cord with sulfur in the rubber is lowered, thereby deteriorating adhesion.

In the present invention, not only reinforcing property of the rubber can be improved by compounding specific silica, and deterioration of processability caused by compounding silica can be suppressed by compounding a silane coupling agent, but also reactivity of the silane coupling agent can be promoted by compounding potassium borate, blistering can be suppressed during the topping process, and roll workability can be improved.

It is an object of the present invention to consider an effect on environment and prepare for the future decrease in supply of petroleum resources by using resources other than petroleum oil as the main component of the rubber composition for coating a steel cord. Therefore, it is preferable not to use carbon black, resin derived from petroleum resources and process oil.

The rubber composition for coating a steel cord of the present invention can be suitably compounded of compounding agents used in the rubber industry, for example, various antioxidants and various vulcanization accelerators according to the necessity in addition to the above-described diene rubber component, silica, silane coupling agent, potassium borate, zinc oxide, sulfur and organic cobalt.

The rubber composition for coating a steel cord of the present invention is prepared by general processes. Namely, the rubber composition for coating a steel cord of the present invention can be prepared by kneading the above-described diene rubber component, silica, silane coupling agent, potassium borate, and the above-described compounding agents according to the necessity by, for example, a Banbury mixer, a kneader, or an open roll, and then vulcanizing the rubber composition.

In preparing the rubber composition for coating a steel cord of the present invention, a kneading temperature of the base rubber is preferably 140° C. to 160° C. When the kneading temperature of the base rubber is less than 140° C., a reaction of the rubber, silica and the silane coupling agent does not proceed effectively, and there is a tendency that rolling resistance is not reduced, and the rubber composition having excellent adhesion and durability cannot be obtained. When the kneading temperature is more than 160° C., sulfur atoms are easily released from the silane coupling agent, vulcanization starts during kneading, and consequently processability tends to be deteriorated.

In the present invention, the kneading temperature of the base rubber means a temperature during kneading of the diene rubber and chemicals excluding sulfur and vulcanization accelerator by using a Banbury mixer or the like.

It is preferable that the rubber composition for coating a steel cord of the present invention is used for a carcass or a belt by coating a steel cord with the composition, and more preferably for a belt for the reason that adhesion strength between the rubber and the steel cord is excellent.

When using for a belt, after forming a belt by coating the steel cord with the rubber composition for coating a steel cord of the present invention, the belt is laminated with other tire members to form an unvulcanized tire which is then vulcanized and thus a pneumatic tire (radial tire, etc.) can be obtained. The belt is used for a radial tire, and functions to strongly tighten a carcass and enhance rigidity of a tread. The belt has a large tension generated by a pneumatic pressure of a tire, and functions to inhibit a large distortion from being generated during rolling between the belt and another neighboring belt crossing at an angle.

The tire of the present invention can be prepared by general processes, using the rubber composition for coating a steel cord of the preset invention. Namely a steel cord is coated with the rubber composition for coating a steel cord of the present invention in an unvulcanized state which is compounded with the above-described compounding agents according to the necessity, and is molded into the form of, for example, a belt, then the belt is laminated with other tire members on a tire molding machine to prepare an unvulcanized tire. The tire of the present invention can be obtained by heating and pressuring this unvulcanized tire in a vulcanizer.

As described above, by using the rubber composition for coating a steel cord of the present invention, the tire of the present invention can be provided as an ecological tire which makes it possible to consider effects on environment and prepare for the future decrease in the petroleum supply.

EXAMPLES

The present invention is specifically explained based on Examples, however, the present invention is not only limited thereto.

Various chemicals used in Examples and Comparative Examples are collectively explained in the following.

Natural rubber (NR): TSR20
Silica (1): Ultrasil VN3 (BET: 175 m$^2$/g) available from Degussa Co.
Silica (2): 115GR (BET: 112 m$^2$/g) available from Rhodia Co.
Carbon black: SHOWBLACK N220 available from CABOT JAPAN K.K.
Silane coupling agent: Si75 (bis(triethoxysilylpropyl)disulfide) available from Degussa Co., and represented by:

$(RO)_3-Si-(CH_2)_x-S_n-(CH_2)_x-Si-(OR)_3$ wherein R is an ethyl residue.

Potassium borate: Potassium tetraborate available from YONEYAMA YAKUHIN KOGYO CO., LTD.
Antioxidant: NOCRAC 6C (N-(1,3-dimethylbutyl)-N'-phenyl-p-phenylenediamine) available from Ouchi Shinko Chemical Industrial CO., LTD
Organic cobalt (1): Cobalt stearate (containing 10.0% by weight of cobalt element) available from Dainippon Ink and Chemicals Industrial, Incorporated.
Organic cobalt (2): Cobalt naphthenate (containing 10.0% by weight of cobalt element) available from Dainippon Ink and Chemicals Industrial, Incorporated.
Organic cobalt (3): Cobalt oleate (containing 10.0% by weight of cobalt element) available from Mitsuwa Chemicals Co., Ltd.
Zinc oxide: Zinc oxide No. 1 available from Mitsui Mining & Smelting Co., Ltd.
Insoluble sulfur: CRYSTEX HSOT20 (insoluble sulfur containing 80% by weight of sulfur and 20% by weight of mineral oil) available from Flexsys Co.
Vulcanization accelerator: NOCCELER DZ (N,N'-dicyclohexyl-2-benzothiazolylsulfenamide) available from Ouchi Shinko Chemical Industrial Co., Ltd.

Examples 1 to 9 and Comparative Examples 1 to 4

According to the compounding prescriptions shown in Table 1, chemicals other than sulfur and a vulcanization accelerator were kneaded for 6 minutes at 150° C. (a kneading temperature of the base rubber), using a Banbury mixer manufactured by Kobe Steel, Ltd., to obtain a kneaded product. Then, the sulfur and vulcanization accelerator were added to the obtained kneaded product and kneaded for 5 minutes at 98° C., using an open roll, to obtain an unvulcanized rubber composition. Further, the obtained unvulcanized rubber composition was press-vulcanized for 14 minutes at 170° C. to obtain vulcanized rubber compositions of Examples 1 to 9 and Comparative Examples 1 and 4.

(Processability)

A test piece having a specified size is prepared from the above-described unvulcanized rubber composition, and according to JIS K 6300 "Test Method of Unvulcanized Rubbers", by using a Mooney viscosity tester, a small rotor is rotated under the temperature condition of 130° C. heated by preheating for 1 minute to measure a Mooney viscosity ($ML_{1+4}$, 130° C.) of the unvulcanized rubber composition after a lapse of 4 minutes. Further, a Mooney viscosity of each composition is expressed as an index by the following calculation formula, assuming the Mooney viscosity index of Comparative Example 1 as 100. The larger the Mooney viscosity index is, the smaller the Mooney viscosity is, which indicates processability is excellent.

(Mooney viscosity index)=(Mooney viscosity of Comparative Example 1)÷(Mooney viscosity of each composition)×100

(Roll Workability)

At the step of using the open roll in the above-mentioned preparation of the vulcanized rubber composition, roll workability is evaluated using two open rolls. A roll temperature is adjusted to 70±3° C. and 25±3° C., respectively. Concretely a rubber is kneaded with the open roll adjusted to 70±3° C., and after confirming that the rubber temperature has reached 70° C. or more, kneading is carried out with the open roll adjusted to 25±3° C., and then adhesion of the rubber to the roll surface is evaluated by the following criteria.

3: The rubber can be peeled off from the roll, and roll workability is excellent.
2: The rubber can be peeled off from the roll, but work for peeling the rubber from the roll by hand is necessary, and roll workability is within an allowable range.
1: The rubber adheres to the roll, and continuous work by means of the roll cannot be carried out. It is necessary to shut down the roll and peel off the rubber from the roll. Roll workability is poor.

(Air-in Test)

A rubber test piece of 5 cm square×1 cm thick is cut off from the above-mentioned vulcanized rubber composition and is left for one hour in an oven, a temperature of which is previously adjusted to 130° C. Then the rubber test piece is taken out and the inside of the rubber test piece is observed to evaluate whether or not generation of air bubbles is present by the following criteria.

5: No air bubbles are recognized.
4: A few small air bubbles having a diameter of less than 1 mm can be confirmed.
3: A few large air bubbles having a diameter of 1 mm or more can be confirmed.
2: A lot of large air bubbles having a diameter of 1 mm or more are generated, and it can be seen that appearance of the test piece is inflating.
1: A lot of air bubbles are connected to each other to form porosity.

(Adhesion of Cord)

Twenty-two brass-plated steel cords are arranged at an interval of 25 mm and coated with the above-mentioned unvulcanized rubber composition, followed by press-vulcanization at 170° C. for 14 minutes to prepare a test piece. Then the rubber is peeled from the steel cord and the rubber coating on the steel cord is evaluated with naked eyes.

5: The whole surface of the steel cord is covered with the rubber.
4: There are a few parts where the steel cord is not covered with the rubber (within five parts in 22 steel cords).
3: There are many parts where the steel cord is not covered with the rubber (within ten parts in 22 steel cords).
2: Almost the whole surface of the steel cord is not covered with the rubber.
1: There is no part where the steel cord is covered with the rubber.

(Rolling Resistance)

A steel cord is coated with the obtained unvulcanized rubber composition and molded into a belt-like shape to prepare an unvulcanized belt, and the unvulcanized belt is laminated with other tire members on a tire molding machine and press-vulcanized at 170° C. for 14 minutes to prepare tires for tests (tire size: 195/65R15, H range).

Rolling resistance of the prepared test tire is measured by using a rolling resistance tester, and rolling resistance of each composition is expressed as an index by the following equation, assuming the rolling resistance index of Comparative Example 1 as 100. The larger the rolling resistance index is, the more the rolling resistance is lowered, which indicates excellent.

(Rolling resistance index)=(Rolling resistance of Comparative Example 1)÷(Rolling resistance of each composition)×100

(Durability Test)

Into the prepared tire was injected a gas comprising 40% of oxygen and 60% of nitrogen, and the inside pressure of the tire is adjusted to 200 MPa. The tire is stored for aging in an oven set at a temperature of 60° C. for three weeks. Under the condition of 100% load according to JIS, the prepared tire is run 30,000 km on a drum (drum running) at a speed of 110 km/h. Then, the tire is cut off at 8 points (cut sections) on the circumference of the tire, and a length of separation (separation length) generated at a belt edge and a neighboring belt edge on a cut section (concretely a length between the belt edge and the neighboring belt edge when the two layers of belts adhered to each other when a tire is prepared are separated due to aging) is measured. The lengths at the 8 points are summed, and the sum total of separation lengths of each composition is expressed as an index by the following calculation formula, assuming the belt edge durability index of Comparative Example 1 as 100. The larger the belt edge durability index is, the more excellent the durability is.

$$\left(\begin{array}{c}\text{Belt edge}\\\text{durability index}\end{array}\right) = \left(\begin{array}{c}\text{The sum total of}\\\text{separation lengths of}\\\text{Comparative Example 1}\end{array}\right) \div \left(\begin{array}{c}\text{The sum total of}\\\text{separation lengths of}\\\text{each composition}\end{array}\right) \times 100$$

Results of the above tests are shown in Tables 1 and 2.

TABLE 1

|  | Ex. | | | Com. Ex. | | | |
| --- | --- | --- | --- | --- | --- | --- | --- |
|  | 1 | 2 | 3 | 1 | 2 | 3 | 4 |
| Amounts (part by weight) | | | | | | | |
| NR | 100 | 100 | 100 | 100 | 100 | 100 | 100 |
| Silica (1) | 56 | — | 75 | — | 56 | 56 | 56 |
| Silica (2) | — | 60 | — | — | — | — | — |
| Carbon black | — | — | — | 58 | — | — | — |
| Silane coupling agent | 5 | 5 | 10 | — | 5 | 5 | 5 |
| Potassium borate | 2 | 2 | 2 | — | — | 0.2 | 5 |
| Antioxidant | 2 | 2 | 2 | 2 | 2 | 2 | 2 |
| Organic cobalt (1) | 1.5 | 1.5 | 1.5 | 1.5 | 1.5 | 1.5 | 1.5 |
| Zinc oxide | 15 | 15 | 15 | 15 | 15 | 10 | 15 |
| Insoluble sulfur | 6.75 | 6.75 | 6.75 | 6.75 | 6.75 | 6.75 | 6.75 |
| Vulcanization accelerator | 1.2 | 1.2 | 1.2 | 1.2 | 1.2 | 1.2 | 1.2 |
| Results of evaluation | | | | | | | |
| Mooney viscosity index | 101 | 103 | 105 | 100 | 100 | 99 | 101 |
| Roll workability | 3 | 3 | 3 | 3 | 1 | 2 | 3 |
| Air-in Test | 5 | 5 | 5 | 5 | 2 | 3 | 5 |
| Adhesion with a cord | 5 | 5 | 5 | 5 | 5 | 5 | 3 |
| Rolling resistance index | 105 | 106 | 103 | 100 | 106 | 104 | 106 |
| Belt edge durability index | 112 | 109 | 116 | 100 | 110 | 109 | 95 |

TABLE 2

|  | Ex. | | | | | |
| --- | --- | --- | --- | --- | --- | --- |
|  | 4 | 5 | 6 | 7 | 8 | 9 |
| Amounts (part by weight) | | | | | | |
| NR | 100 | 100 | 100 | 100 | 100 | 100 |
| Silica (1) | 56 | 56 | 56 | 56 | 56 | 56 |
| Silane coupling agent | 5 | 5 | 5 | 5 | 5 | 5 |
| Potassium borate | 2 | 2 | 2 | 2 | 2 | 2 |
| Antioxidant | 2 | 2 | 2 | 2 | 2 | 2 |
| Organic cobalt (1) | — | — | 0.5 | 2 | 1.5 | 1.5 |
| Organic cobalt (2) | 1.5 | — | — | — | — | — |
| Organic cobalt (3) | — | 1.5 | — | — | — | — |
| Zinc oxide | 15 | 15 | 15 | 15 | 10 | 20 |
| Insoluble sulfur | 6.75 | 6.75 | 6.75 | 6.75 | 6.75 | 6.75 |
| Vulcanization accelerator | 1.2 | 1.2 | 1.2 | 1.2 | 1.2 | 1.2 |
| Results of evaluation | | | | | | |
| Mooney viscosity index | 106 | 102 | 99 | 103 | 100 | 105 |
| Roll workability | 3 | 3 | 3 | 3 | 3 | 3 |
| Air-in Test | 5 | 5 | 5 | 5 | 5 | 5 |
| Adhesion with a cord | 5 | 5 | 5 | 5 | 4 | 5 |
| Rolling resistance index | 106 | 105 | 104 | 107 | 105 | 104 |
| Belt edge durability index | 113 | 110 | 108 | 113 | 109 | 108 |

Comparative Example 1 is a conventional rubber composition for coating a steel cord containing carbon black.

In Comparative Examples 2 and 3, in which the amount of potassium borate is less than the specified amount, generation of bubbles cannot be suppressed, roll workability is not improved, and as a result productivity is inferior.

In Comparative Example 4, in which the amount of potassium borate is more than the specified amount, adhesion to a steel cord is inferior, and belt edge durability is also inferior.

On the other hand, since the rubber compositions of Examples 1 to 9 contain the specified amounts of silica, a silane coupling agent and potassium borate, generation of bubbles can be suppressed, rolling resistance can be reduced, and processability, roll workability, adhesion to a steel cord and durability can be improved with favorable balance.

The present invention can provide a rubber composition for coating a steel cord, use of which makes it possible to consider an effect on environment, prepare for the future decrease in supply of petroleum resources, suppress generation of bubbles, reduce rolling resistance, and improve processability, roll workability, adhesion to a steel cord and durability with favorable balance, as compared with a rubber composition for coating a steel cord comprising raw materials derived from petroleum resources as main components, and can provide a tire having a belt prepared by using the composition since the rubber composition contains a diene rubber component, specific silica, a silane coupling agent and potassium borate in specified amounts.

What is claimed is:

1. A tire having a belt prepared by using a rubber composition for coating a steel cord, comprising:

40 to 80 parts by weight of silica having a nitrogen adsorbing-specific surface area of 100 to 200 $m^2/g$;
1 to 15 parts by weight of a silane coupling agent;
0.5 to 3 parts by weight of potassium borate;
10 to 20 parts by weight of zinc oxide;
3.5 to 6 parts by weight of sulfur; and
0.5 to 2 parts by weight of organic cobalt,
on the basis of 100 parts by weight of a diene rubber component, wherein said organic cobalt is at least one kind selected from the group consisting of cobalt naphthenate, cobalt stearate, cobalt oleate and cobalt maleate or at least two kinds thereof in combination.

2. The tire having a belt prepared by using a rubber composition for coating a steel cord according to claim 1, wherein said silane coupling agent is represented by the following general formula:

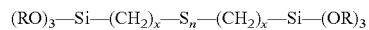

$(RO)_3-Si-(CH_2)_x-S_n-(CH_2)_x-Si-(OR)_3$ wherein R is a linear or branched alkyl group having 1 to 8 carbon atoms, x is an integer of 1 to 8, n represents the number of sulfur atoms in a polysulfide part, and an average value of n is 2 to 3,
and an amount of the silane coupling agent having two sulfur atoms in the polysulfide part is not less than 60% by weight in the whole silane coupling agent.

3. The tire having a belt prepared by using a rubber composition for coating a steel cord according to claim 1, wherein a kneading temperature of a base rubber is 140° C. to 160° C.

4. The tire having a belt prepared by using a rubber composition for coating a steel cord of claim 2, wherein a kneading temperature of a base rubber is 140° C. to 160° C.

* * * * *